United States Patent [19]
Taylor et al.

[11] Patent Number: 5,632,603
[45] Date of Patent: May 27, 1997

[54] SLURRY TRANSFER AND DENSIFICATION THROUGH VACUUM PUMPING

[75] Inventors: Kenneth R. Taylor, Norfolk; Chih-Chung Wang, Lexington, both of Mass.

[73] Assignee: Duracell Inc., Bethel, Conn.

[21] Appl. No.: 384,286

[22] Filed: Feb. 1, 1995

[51] Int. Cl.$^6$ .................. F04B 23/08; B01D 19/00; H01M 4/04
[52] U.S. Cl. .................. 417/53; 417/199.2; 95/266; 96/193; 429/229
[58] Field of Search .................. 417/199.1, 199.2, 417/53, 205, 900, 474; 95/246, 247, 266; 96/193; 429/70, 229

[56] References Cited

U.S. PATENT DOCUMENTS

| | | | |
|---|---|---|---|
| 4,378,978 | 4/1983 | Andersson et al. | 96/193 |
| 4,943,496 | 7/1990 | Okada et al. | 429/45 |
| 5,025,551 | 6/1991 | Rose et al. | 29/730 |
| 5,290,359 | 3/1994 | Coonen et al. | 118/712 |

FOREIGN PATENT DOCUMENTS

| 1414410 | 7/1988 | U.S.S.R. | 96/193 |
|---|---|---|---|

*Primary Examiner*—Timothy Thorpe
*Assistant Examiner*—William Wicker
*Attorney, Agent, or Firm*—Robert J. Feltovic; Rose M. Allen; Barry D. Josephs

[57] ABSTRACT

An apparatus for the transfer or conveyance of a slurry and the simultaneous densification thereof through the intermediary of vacuum pumping. Specifically, disclosed is an apparatus for the vacuum pumping of a slurry, particularly a zinc-containing slurry utilized in the preparation of zinc anodes for alkaline batteries, which facilitates the transfer of the slurry and the concurrent densification thereof in conjunction with the elimination of any gas bubbles which are entrapped in the slurry. Also disclosed is a method of transferring and simultaneously densifying a slurry while eliminating entrapped gas bubbles therefrom through the intermediary of a vacuum pumping process utilizing the disclosed apparatus.

11 Claims, 2 Drawing Sheets

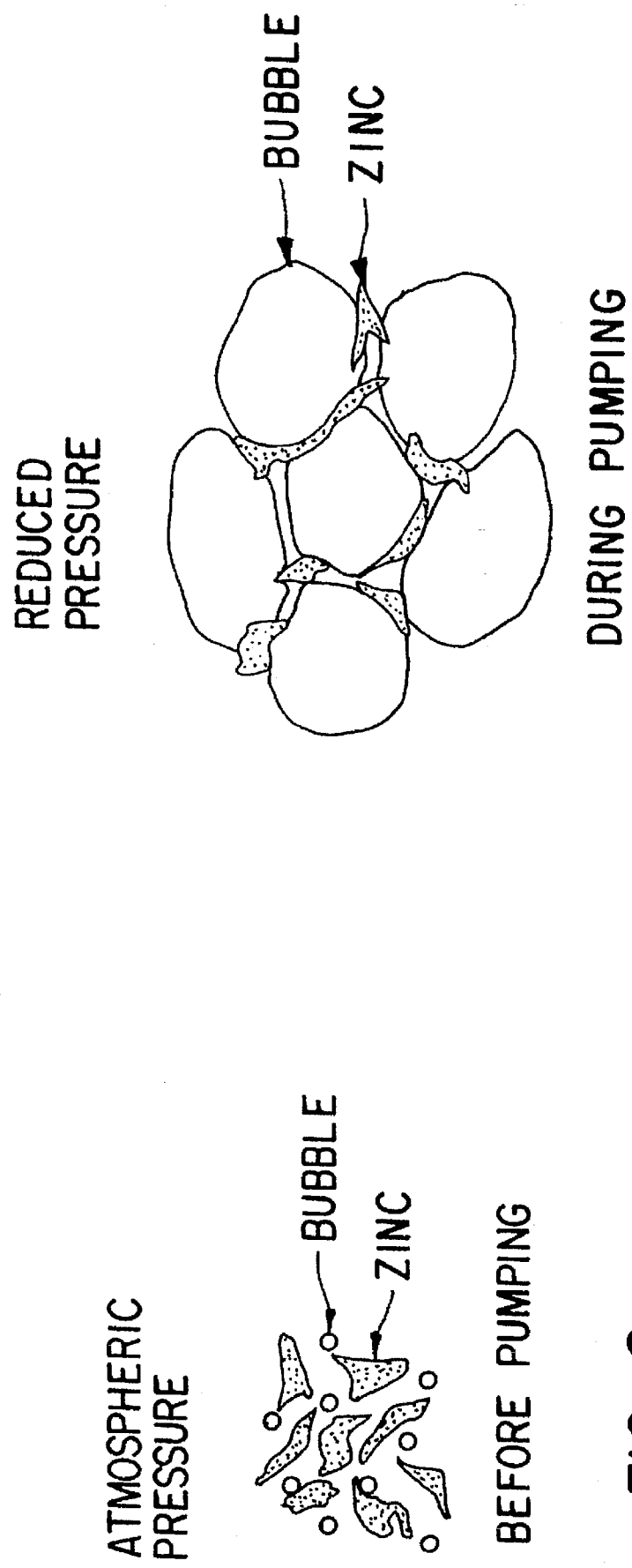

SLURRY TRANSFER AND DENSIFICATION THROUGH VACUUM PUMPING

BACKGROUND OF THE INVENTION

1. Field of the Invention

The present invention relates to an apparatus for the transfer or conveyance of a slurry and the simultaneous densification thereof through the intermediary of vacuum pumping. Specifically, the invention pertains to an apparatus for the vacuum pumping of a slurry, particularly a zinc-containing slurry utilized in the preparation of zinc anodes for alkaline batteries, which facilitates the transfer of the slurry and the concurrent densification thereof in conjunction with the elimination of any gas bubbles which are entrapped in the slurry. Moreover, pursuant to a further aspect, the invention is also directed to the provision of a method of transferring and simultaneously densifying of a slurry while eliminating entrapped gas bubbles therefrom through the intermediary of a vacuum pumping process utilizing the apparatus of the invention.

2. Discussion of the Prior Art

An important aspect in the formation of slurries which are employed as the basic materials for the production of alkaline battery anodes, whereby such slurries generally contain primarily zinc constituents, resides in that the slurries must exhibit consistent densities essentially devoid of entrained gas bubbles in order to be able to formulate industrially and commercially acceptable battery components. This is a problem which has heretofore been inadequately solved in the technology relating to the formation of battery anode slurries.

In essence, the demands of industry necessitate that electrical batteries be able to meet and maintain specific performance standards, and in order to comply with these requisites, among other considerations, the battery anode must possess a uniform consistency and specific density and consistency throughout the material. Slurries which are formulated for the mass-production of alkaline battery anodes and which extensively contain zinc as a primary constituent, are produced through a variety of means.

The initial zinc anode slurry for the alkaline batteries is essentially produced in batch sequences; for example, through dry mixing, wet mixing, pregelling, reworking and the like, at some period in time prior to conveying or pumping the slurries to the battery cell manufacturing assembly for producing the anode constituent of the battery cells. Pumping of the slurry is implemented in timed cooperation with the slurry forming process, preferably through the use of a slurry vacuum pump apparatus. This batchwise slurry forming process sequence generally causes the presence of entrained bubbles to be encountered; for instance, such as air bubbles or other gas bubbles generated by the contacting between zinc and the metallic walls of the mixing vessels, during mixing of the slurry constituents so as to during transfer of the slurry to cell assemblies produce uneven densities in the various cells, thus adversely affecting the desired battery cell consistencies and physical characteristics. Although attempts have been made to eliminate the presence of gas or air bubbles which are entrained in the slurry batches, the elimination of bubbles and densification of the slurries prior to transfer of the battery cell producing facilities is still somewhat of being supplemented in meeting the quality standards of the alkaline storage battery manufacturing industry. For instance, among problems encountered are the formation of small bubbles (micro-bubbles) during slurry mixing and processing, the zinc to steel contact resulting in hydrogen gas bubbles, and large (macro) bubbles produced during slurry transfer. These aspects cause erratic slurry dispensing; i.e., burping and spitting when poured into the cells; variations in anode weights during dispensing, with concomitant inefficient utilization of internal battery anode space and battery characteristics and properties, rendering them commercially unusable.

SUMMARY OF THE INVENTION

Accordingly, in order to clearly and unambiguously obviate the limitations encountered in the current state of this technology, the present invention is directed to the provision of a novel and highly utilitarian apparatus and method for the continuous transfer and simultaneous densification of zinc anode slurries with the concurrent removal of gas bubbles entrained therein; especially during conveyance of the slurry to a battery cell assembly employed in forming alkaline battery anodes. In order to attain the foregoing, the invention sets forth the provision of a slurry vacuum pump arrangement in which a vertically depending tube or riser is adapted to pick-up and aspirate a continuous quantity of anode slurry which has been previously mixed and which has been transported to the locale of the vertical tube through the intermediary of a suitable transport vehicle or dolly, and whereby the upper end of the vertical conduit is connected to a downwardly sloping conduit which is subjected to a subatmospheric pressure or vacuum through the intermediary of a vacuum pump. A continuous stream of slowly downwardly flowing slurry in the sloping conduit received from the upper end of the vertical tube or riser has the bubbles contained therein expanded under the action of the subatmospheric pressure or vacuum to which the slurry is subjected, causing the bubbles entrained therein to rise and burst and to be aspirated away through the vacuum pump. The resultingly degassed and densified slurry flows downwardly from the lower end of the sloping conduit into a vertically depending conduit so as to form a slurry column therein, the lower end of which conduit is connected to the inlet of a vacuum-assisted peristaltic pump. The peristaltic pump then pumps the densified slurry material which is essentially devoid of any entrained air bubbles and which consequently possesses a uniform desired density or consistency through a pump discharge into a discharge conduit leading to a cell assembly for forming the alkaline battery cell anodes. Although the vertical tube which forms the riser for receiving the slurry from the batch slurry mixing unit is basically intermittently submerged in slurry, upon the slurry being upwardly aspirated therethrough, a continuous flow of slowly advancing slurry flow is produced in the downwardly sloping conduit so as to enable the expansion and elimination through a bursting thereof in the vacuum atmosphere by the bubbles which were entrained in the slurry. This elimination of the bubbles of gaseous medium ensures an appropriate densification of the slurry and consistency thereof when continuously flowing downwardly from the sloping conduit towards the peristaltic pump for conveyance by the letter to the battery cell forming assembly.

Accordingly, it is an object of the present invention to provide a vacuum pumping apparatus for the continuous transfer of a flow of a slurry from a slurry forming arrangement to a pumping arrangement, while concurrently densifying the slurry to a specific consistency and removing any entrained air or gas bubbles therefrom.

Another object of the present invention is to provide a vacuum pumping apparatus for transferring and densifying a slurry received from a slurry forming arrangement while removing gas bubbles entrained in the slurry and to enable a peristaltic pump to supply a continuous flow of densified slurry from which the gas bubbles have been aspirated to a battery cell producing assembly.

Yet another object of the present invention is to provide a method for producing a degassified and densified anode slurry and transferring the latter in a controlled flow to a cell assembly for the production of battery cell anodes.

Still another object of the present invention is to provide a method for producing a continuous flow of densified and degassified anode slurry received from a bag slurry producing arrangement by treatment thereof under a vacuum atmosphere so as to separate entrained gas bubbles therefrom and for transferring a flow of the densified slurry through the intermediary of a peristaltic pump to a battery cell anode producing assembly.

BRIEF DESCRIPTION OF THE DRAWINGS

Reference may now be had to the following detailed description of an exemplary embodiment of the invention, taken in conjunction with the accompanying drawings; in which:

FIG. 2a illustrates a schematic representation of zinc particles between gas bubbles entrained in a zinc anode slurry prior to processing thereof in the vacuum pumping arrangement of the invention; and FIG. 2b illustrates the zinc particles and entrained bubbles in the zinc anode slurry during the vacuum pumping process.

DETAILED DESCRIPTION OF A PREFERRED EMBODIMENT

Figure 1:
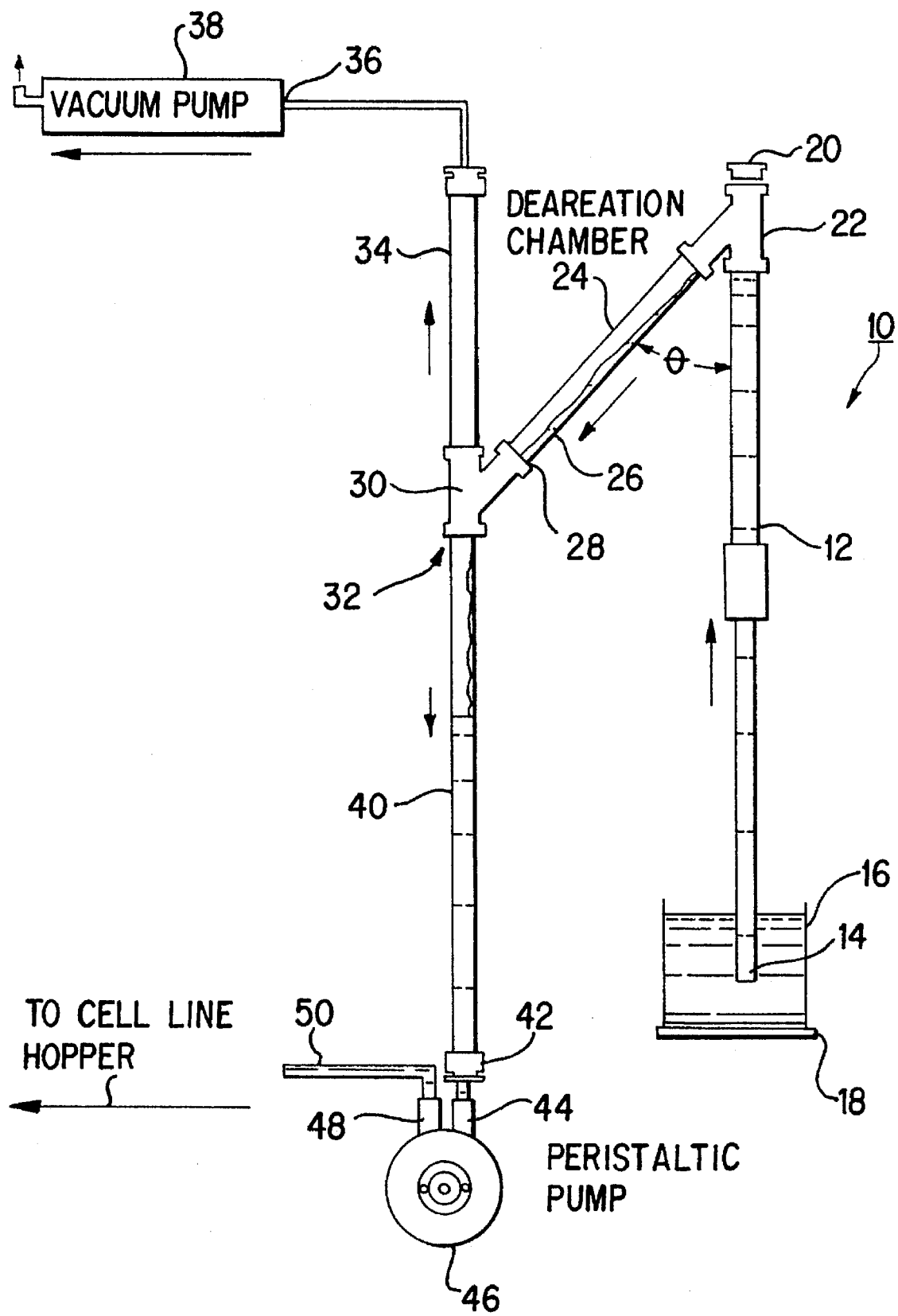
FIG. 1 illustrates, generally diagrammatically, a vacuum pumping arrangement for the continuous transfer and densification through the degassification of a slurry.

The formation of a slurry which is adapted to be employed to produce the zinc anodes of alkaline battery cells, wherein the slurries are normally produced in batches, or possibly through continuous processes, through suitable means. Thereafter, the formed slurry is filled into a suitable container, or the container in which the slurry was formed, and transported for dispensing to a battery cell forming assembly wherein specified quantities of the slurry are metered so as to produce the battery anodes. During the production, or essentially intermixing the constituents of the anode material for the slurry, due to the interaction of the normally therein contained zinc component with the metallic wall surfaces of the mixing vessel, there is encountered an inclusion or entrainment of gas bubbles which are trapped in the slurry. These gas bubbles may be either in the form of minutely-sized or so-called "micro-bubbles" resulting from hydrogen gas evolved due to the zinc anode material and steel vessel contacting during the slurry mixing process, and also when the slurry is transferred to a battery cell manufacturing assembly through various conduits. In the last instance, there are formed large-sized gas bubbles which are designated as so-called "macro-bubbles." The presence or entrapment of these various gas bubbles in the slurry when the slurry is being conducted into the alkaline battery cells in order to form the zinc anodes, frequently results in either an erratic or non-uniform slurry dispensing from the metering or transfer apparatus; such as burping or spitting of slurry material so as to thereby provide for a low anode weight and "spill overs"; and possibly a variation in anode material weight. There is also often encountered the inefficient use of the internal space of the battery cell due to the possible low density of the slurry, resulting in a higher anode column height.

A primary concern in obviating the foregoing problems which are associated with the entrainment of gas bubbles in the anode slurry leading to non-uniformity in its density and properties as a battery anode material resides in the elimination of the entrapped gas bubbles prior to the slurry being dispensed into the battery cells for forming the alkaline battery anodes.

In order to achieve the desired densification and consistency for a commercially viable and uniform anode slurry, recourse may be had to the invention of FIG. 1 of the drawings illustrating, generally diagrammatically, a vacuum pumping apparatus 10 for eliminating gas or air bubbles which are entrapped in the anode slurry.

The vacuum pumping apparatus 10 basically includes a vertical tube or riser 12 which has an open lower end 14 thereof adapted to be inserted into a quantity or batch of premixed zinc anode slurry which was formed by being produced in a suitable manner. As shown in phantom lines, the batch of slurry, into which the lower end 14 of the vertical tube 12 is inserted, may be contained in a suitable vessel 16, which may be possibly, although not necessarily, supported on a suitable transport vehicle, 18. The upper end 20 of the vertical riser or tube 12 communicates through the intermediary of a suitable angle or Y-connector 22 with the upper end 24 of a downwardly sloping or inclined conduit 26 which subtends an acute angle Θ with the vertical axis of the tube or riser 12. The lower end 28 of the downwardly inclined conduit 26 is connected by means of a suitably angled Y-connector 30 with a vertically oriented conduit structure 32. The conduit structure has an upwardly extending portion 34 leading from connector 30 and which is connected at its upper end 36 to a vacuum pump 38. A second conduit portion 40 of conduit structure 32 extends vertically downwardly from connector 30 so as to connect at the lower end 42 thereof with an inlet 44 of a vacuum-assisted peristaltic pump 46. The peristaltic pump 46 possesses a discharge outlet 48 having a further conduit 50 attached thereto, and which leads to a battery cell line hopper (not shown) for conveying a predetermined continuous feed of the slurry of zinc anode material from the pump 46 to the battery cells.

As indicated in the graphical representation of FIGS. 2a and 2b of the drawings, during the formation of the zinc anode slurry, through the aggregation and mixing of the constituent materials, air and/or gas bubbles are generated and dispersed throughout the slurry, whereby the trapped air bubbles or gas bubbles do not rupture easily, and consequently are difficult to separate out of the slurry. FIG. 2a shows the presence of gas bubbles interspaced between the zinc constituents of the slurry before the vacuum pumping of the latter by means of vacuum pumping apparatus 10. However, during the imposition of a vacuum by the vacuum pumping apparatus 10 pursuant to the invention, the zinc particles contained in the slurry are assumed to assist in rupturing the film surface of the bubbles as the bubbles expand and the film thins, as illustrated in FIG. 2b.

As the vacuum is increased due to the vacuum action of the vacuum pumping apparatus 10, such as up to 29 inches Hg, the bubble size contained in the slurry will expand. This aspect is indicated in Table I hereinbelow, illustrating bubble diameter at increasing slurry depth as the slurry is conveyed upwardly through the riser.

TABLE I

BUBBLE DIAMETER vs "INCREASING" VACUUM

| ABSOLUTE PRESSURE (mm Hg) | GAUGE PRESSURE* (in. Hg) | BUBBLE DIAMETER (um) | |
|---|---|---|---|
| 760 | −0 | 50 | (original size) |
| 340 | −16.54 | 65 | |
| 100 | −25.98 | 98 | |
| 20 | −29.13 | 168 | |
| 10 | −29.53 | 212 | (4× original size) |
| 5 | −29.72 | 267 | |
| 2 | −29.84 | 362 | |
| 1 | −29.88 | 456 | |

*Based on an atmospheric pressure of 760 mm Hg absolute.

OPERATION OF THE VACUUM PUMPING APPARATUS

A flow of slurry is picked up and aspirated at the lower end 14 of the vertical tube or riser 12 from the slurry batch contained in vessel 16 towards the upper end 20 of the vertical riser 12. This suctioning effect or action is produced by the vacuum pump 38 which creates a vacuum or subatmospheric condition in the conduits 12, 26 and 32 of the apparatus 10 of up to about 29 or 30 inches Hg. As the flow of slurry from riser 12 reaches the upper end 24 of downwardly inclined conduit 26, a continuous flow of the slurry streams slowly under the effect of gravity downwardly towards the lower end 28 of the conduit 26 where the latter forms the juncture with the vertical conduit section 32 leading to, respectively, the vacuum pump 38 by means of conduit portion 34 and the vacuum-assisted peristaltic pump 46 through conduit portion 40.

The vacuum pump draws a specified vacuum, for example up to 29 inches of mercury, causing the bubbles entrapped within the slurry flowing slowly down the conduit 26 to be subjected to a reduced pressure, as described hereinbefore, and to expand as shown in FIG. 26 and burst, thereby releasing the gas from the slurry and enabling the gaseous medium to be aspirated upwardly through the vertically upwardly extending conduit portion 34 towards the vacuum pump 38 for discharge into atmosphere.

The resultingly deaerated and densified slurry which passes from the lower end 28 of conduit 26 through the Y-connector 30 will then slide downwardly columnarly within conduit portion 40 under the action of gravity so as to form a column of the densified and deaerated slurry at the end 42 above the inlet connection 44 to the vacuum-assisted peristaltic pump 46. The pump 46 then conveys the densified slurry through outlet 50 to suitable anode cell line hopper or cell assembly arrangement for forming the alkaline battery cell anodes.

From the foregoing it becomes readily apparent that the inventive method and apparatus 10 for the vacuum pumping of a zinc anode slurry enables the continual transfer and densification of the slurry while simultaneously eliminating any gas or air bubbles entrained therein. In this connection, Table II illustrates the slurry densities for a series of anode slurries before and after vacuum pumping by the inventive apparatus, as shown:

TABLE II

SLURRY DENSITIES BEFORE AND AFTER VACUUM PUMPING

| Slurry Batch No. | Theoretical Density | Density Before Pumping (gr/cc) | Density After Pumping (@ 25 mm Hg) (gr/cc) |
|---|---|---|---|
| 1 | (2.97) | 2.74 | 2.89 |
| 2 | (2.97) | | 2.85 |
| 3 | (2.97) | 2.62 | 2.85 |
| 4 | (2.97) | 2.49 | 2.81 |
| 5 | (2.97) | 2.56 | 3.04 |
| 6 | (2.97) | 2.73 | 2.90 |
| 7 | (2.97) | 2.48 | 3.05 |
| 8 | (2.97) | 2.79 | 2.95 |
| 9 | (2.97) | 2.78 | 2.97 |
| 10 | (2.97) | 2.59 | 2.88 |
| 11 | (2.97) | 2.59 | 2.84 |
| 12 | (2.97) | 2.57 | 2.87 |
| 13 | (2.97) | 2.60 | 2.88 |
| 14 | (2.97) | 2.78 | 2.97 |
| 15 | (2.97) | 2.79 | 2.95 |
| 16 | (2.97) | 2.85 | 2.93 |

The slurry product attained thereby; in effect the zinc anode slurry which is discharged from the peristaltic pump exhibits an increased and constant density devoid of any significant gas bubbles and is representative of a consistency of the final product which is highly acceptable in the battery manufacturing industry.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A vacuum pumping apparatus for the transfer and densifying of a flow of a slurry having a gaseous medium dispersed therein, said apparatus comprises conduit means for conveying said slurry along a predetermined flow path; first pump means generating a subatmospheric pressure in said conduit means for separating said gaseous medium from said slurry; and second pump means comprising a vacuum-assisted peristaltic pump communicating with a discharge end of said conduit means for dispensing a flow of said degassified and densified slurry from said apparatus.

2. A vacuum pumping method for the transfer and densifying of a flow of a slurry having a gaseous medium dispersed therein; said method comprising conveying said slurry along a predetermined flow path; subjecting said slurry to a subatmospheric pressure along said flow path for separating said gaseous medium from said slurry; venting said separated gaseous medium; and discharging said flow of degassified and densified slurry for further processing thereof; wherein said degassified and densified slurry is conveyed to a vacuum-assisted peristaltic pump at a discharge end of said flow path.

3. A vacuum pumping apparatus for the transfer and densifying of a flow of a slurry having a gaseous medium dispersed therein, said apparatus comprises conduit means for conveying said slurry along a predetermined flow path, said conduit means comprising a first conduit portion having a vertical riser and a first end immersible into a supply of said slurry; said first end of said first conduit portion being the lower end; a second conduit portion connected to a second end of said first conduit portion for receiving a continuous flow of slurry from said first conduit portion, said second conduit portion being downwardly inclined relative to a horizontal plane and having an upper end connected to the second end of said vertical riser for receiving the flow of slurry therefrom;

first pump means generating a subatmospheric pressure in said conduit means for separating said gaseous medium from said slurry, said first pump means aspirating said gaseous medium from said slurry during the flow of said slurry through said second conduit portion; and second pump means communicating with a discharge end of said conduit means for dispensing a flow of said degassified and densified slurry from said apparatus.

4. An apparatus as claimed in claim 3, wherein said first pump means aspirates entrapped gaseous medium from the flow of slurry continuously streaming downwardly through said second conduit portion towards the juncture thereof with a third conduit portion of said conduit means.

5. An apparatus as claimed in claim 4, wherein said third conduit portion comprises a vertical conduit section extending upwardly from the juncture with said second conduit portion and having an upper end communicating with said first pump means, and a vertical conduit section extending downwardly from the juncture with said second conduit portion end having a lower end connected to an inlet of said second pump means for directing a continuous flow of densified slurry from said second conduit portion to said second pump means.

6. A vacuum pumping method for the transfer and densifying of a flow of a slurry having a gaseous medium dispersed therein; said method comprising conveying said slurry along a predetermined flow path; subjecting said slurry to a subatmospheric pressure along said flow path for separating said gaseous medium from said slurry; venting said separated gaseous medium; and discharging said flow of degassified and densified slurry for further processing thereof; wherein said flow path comprises a first conduit portion having a first end immersible into a supply of said slurry; said first conduit portion comprises a vertical riser, said first end of said first conduit portion being the lower end immersible into said slurry, a second conduit portion connected to a second end of said first conduit portion for receiving a continuous flow of slurry from said first conduit portion, said second conduit portion being downwardly inclined relative to a horizontal plane and having an upper end connected to the second end of said vertical riser for receiving the flow of slurry therefrom; and said gaseous medium is aspirated from said slurry during the flow of said flurry through said second conduit portion.

7. A method as claimed in claim 6, wherein said entrapped gaseous medium is aspirated from the flow of slurry which continuously streams downwardly through said second conduit portion towards the juncture thereof with a third conduit portion of said flow path.

8. A method as claimed in claim 7, wherein said third conduit portion comprises a vertical conduit section extending upwardly from the juncture with said second conduit portion and having an upper end communicating with a pump for generating said subatmospheric pressure, and a vertical conduit section extending downwardly from the juncture with said second conduit portion end having a lower end connected to an inlet of a second pump for directing a continuous flow of densified slurry from said second conduit portion to said second pump.

9. A method as claimed in claim 8, wherein said second pump discharges the densified anode slurry to an arrangement for producing battery cells.

10. A method as claimed in claim 8, wherein said gaseous medium comprises gas bubbles entrapped in said slurry, said subatmospheric pressure in said conduit means generated by said first pump expanding and bursting said bubbles to facilitate deaerating and densifying of said slurry.

11. A method as claimed in claim 10, wherein said gas bubbles comprise air bubbles.

* * * * *